US011086797B2

(12) United States Patent
Lesartre et al.

(10) Patent No.: US 11,086,797 B2
(45) Date of Patent: Aug. 10, 2021

(54) SYSTEMS AND METHODS FOR RESTRICTING WRITE ACCESS TO NON-VOLATILE MEMORY (71) Applicant: HEWLETT PACKARD ENTERPRISE DEVELOPMENT LP, Houston, TX (US)

(72) Inventors: Gregg B. Lesartre, Fort Collins, CO (US); Joseph E. Foster, Houston, TX (US); David Plaquin, Bristol (GB); James M. Mann, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 592 days.

(21) Appl. No.: 15/518,218

(22) PCT Filed: Oct. 31, 2014

(86) PCT No.: PCT/US2014/063332
§ 371 (c)(1),
(2) Date: Apr. 10, 2017

(87) PCT Pub. No.: WO2016/068981
PCT Pub. Date: May 6, 2016

(65) Prior Publication Data
US 2017/0293573 A1 Oct. 12, 2017

(51) Int. Cl.
*G06F 12/14* (2006.01)
*G06F 12/02* (2006.01)
*G06F 12/1081* (2016.01)

(52) U.S. Cl.
CPC ........ *G06F 12/1433* (2013.01); *G06F 12/145* (2013.01); *G06F 12/1441* (2013.01);
(Continued)

(58) Field of Classification Search
CPC ........... G06F 2212/1052; G06F 3/0622; G06F 12/1425; G06F 12/1441; G06F 12/14
(Continued)

(56) References Cited

U.S. PATENT DOCUMENTS 5,938,758 A * 8/1999 Katayama ............. G06F 9/3802
710/260
6,883,075 B2 * 4/2005 Lin ....................... G06F 21/6209
711/163
(Continued)

FOREIGN PATENT DOCUMENTS

WO WO-2008122325 A1 10/2008

OTHER PUBLICATIONS

International Search Report & Written Opinion received in PCT Application No. PCT/US2014/063332, dated Jul. 13, 2015, 12 pages.
(Continued)

*Primary Examiner* — Faisal M Zaman
(74) *Attorney, Agent, or Firm* — Hewlett Packard Enterprise Patent Department (57) ABSTRACT A method for restricting write access to a non-volatile memory. The method includes receiving a request to write to a protected location in the non-volatile memory and determining whether the protected location is in a write-protected state. If the protected location is not in a write-protected state, the method includes writing data indicated by the request to the protected location. If the protected location is in a write-protected state, the method includes rejecting the request. The protected location stores a validation key to validate the contents of another portion of the non-volatile memory.

8 Claims, 5 Drawing Sheets (52) U.S. Cl.
CPC ...... *G06F 12/0238* (2013.01); *G06F 12/1081* (2013.01); *G06F 2212/7207* (2013.01)

(58) Field of Classification Search
USPC ...... 710/3, 200; 711/163, E12.099, E12.097, 711/164; 713/193, 165, 161, 166
See application file for complete search history.

(56) References Cited

U.S. PATENT DOCUMENTS

| | | | |
|---|---|---|---|
| 7,465,951 B2 | 12/2008 | Scheuerlein et al. | |
| 8,339,832 B2 | 12/2012 | Kato | |
| 8,533,414 B2 | 9/2013 | Yu et al. | |
| 8,561,204 B1 * | 10/2013 | Dalcher | G06F 21/60 726/27 |
| 8,639,946 B2 | 1/2014 | Baker | |
| 8,838,911 B1 | 9/2014 | Hubin et al. | |
| 8,996,888 B2 * | 3/2015 | Nemazie | G06F 12/1441 455/410 |
| 2003/0149851 A1 * | 8/2003 | Shiota | G06F 12/1425 711/163 |
| 2004/0196707 A1 * | 10/2004 | Yoon | G06F 12/0246 365/200 |
| 2005/0210211 A1 * | 9/2005 | Kodama | G06F 3/0623 711/163 |
| 2006/0262441 A1 * | 11/2006 | Kuhar | B82Y 10/00 360/1 |
| 2008/0250509 A1 | 10/2008 | Ahvenainen | |
| 2009/0138729 A1 * | 5/2009 | Hashimoto | G06F 12/1416 713/193 |
| 2010/0223479 A1 * | 9/2010 | Nguyen | G06F 21/77 713/193 |
| 2011/0047618 A1 * | 2/2011 | Evans | G06F 21/566 726/23 |
| 2011/0289259 A1 | 11/2011 | Lee | |
| 2011/0292805 A1 * | 12/2011 | Mitsuhashi | H04L 43/0894 370/237 |
| 2011/0314296 A1 * | 12/2011 | Dolgunov | G06F 21/31 713/185 |
| 2012/0066770 A1 * | 3/2012 | Hayashi | G06F 21/52 726/26 |
| 2012/0102284 A1 * | 4/2012 | Odaira | G06F 9/4493 711/163 |
| 2012/0151126 A1 * | 6/2012 | Moore | G06F 1/16 711/103 |
| 2012/0216007 A1 * | 8/2012 | Tsirkin | G06F 9/526 711/173 |
| 2012/0231730 A1 | 9/2012 | Liu | |
| 2013/0247231 A1 | 9/2013 | Sibert | |
| 2013/0262810 A1 * | 10/2013 | Chang | G06F 12/0246 711/170 |
| 2014/0082257 A1 * | 3/2014 | Scouller | G06F 21/6218 711/103 |
| 2014/0095822 A1 * | 4/2014 | Shiga | G06F 12/1441 711/163 |
| 2015/0186295 A1 * | 7/2015 | Savagaonkar | G06F 12/1408 713/193 |

OTHER PUBLICATIONS

Li, J. et al., "Write-Once-Memory-Code Phase Change Memory," (Research Paper), Dec. 16, 2013, 6 pages, available at https://www.date-conference.com/date16/files/proceedings/2014/pdffiles/07.5_2.pdf.

* cited by examiner

```
Receiving a request to write to a protected location in NVM
202
        ↓
Determining whether the protected location is in a write-protected state
204
        ↓
If the protected location is not in a write-protected state, writing data
indicated by the request to the protected location
206
        ↓
If the protected location is in a write-protected state, rejecting the request
208
```

```
Computing a checksum for another sector of NVM
212
        ↓
Comparing the computed checksum to a validation key
214
        ↓
Validating the sector of the non-volatile memory if the computed
checksum matches the validation key
216
```

Routing read and write requests for an address or address range corresponding to the protected location to the media controller
222

Passing read and write requests to addresses other than the address or address range corresponding to the protected location directly to NVM
224

SYSTEMS AND METHODS FOR RESTRICTING WRITE ACCESS TO NON-VOLATILE MEMORY

BACKGROUND

Certain portions of memory are often write-protected to ensure overall system security. For example, it is advantageous to restrict write access to system firmware, a system boot sequence, basic input/output system (BIOS), and the like. Typically, such sensitive information is stored on a dedicated write-once memory device. However, the desire for smaller and cheaper computing systems renders the cost and size associated with such a dedicated write-once, protected memory burdensome.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art appreciates, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

To address the problems noted above, write-once memory operation is provided within a general purpose non-volatile memory (NVM) such as, for example, a memristor. In accordance with various examples of the present disclosure, a media controller is provided in a path between the NVM and a processing unit. It should be understood from the outset that, as used herein, the term processing unit may refer to a central processing unit (or a core thereof), a microprocessor, a micro-controller, an application specific integrated circuit (ASIC), field programmable gate array (FPGA), or other type of circuit to perform various processing functions. The scope of this disclosure is not intended to be limited to any particular type of processing unit.

Based in part on the functionality of the media controller, write-once protection is provided for at least a portion of the NVM, while other portions of the NVM are available for normal access by the processing unit. In this way, the benefits of write-once protection are available without requiring a dedicated write-once memory component, thereby reducing overall system size and cost.

Figure 1A:
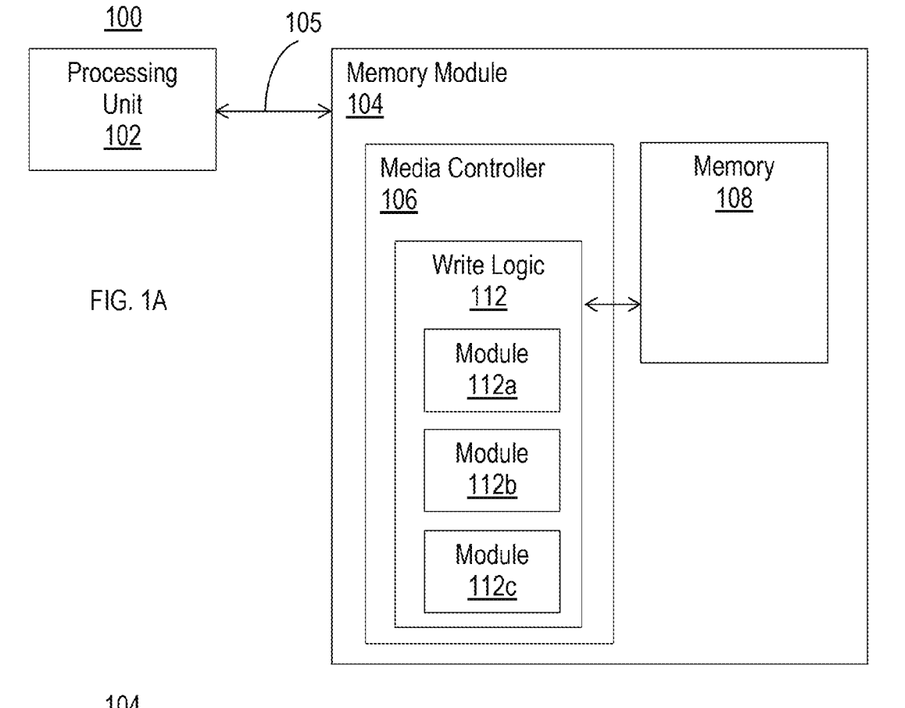
FIG. 1A shows a block diagram of a system in accordance with various examples of the present disclosure.

Turning now to FIG. 1A, a system 100 is shown in accordance with various examples of the present disclosure. The system may comprise any number of computing devices, such as a workstation, a laptop, a smartphone, a storage server, a server blade, and the like. The scope of the present disclosure is not limited to one particular type of computing device.

The system 100 includes a processing unit 102 that is coupled to a memory module 104 by way of an interconnect 105. It should be understood that the system 100—and components thereof—may include additional components not explicitly shown in FIG. 1A, and that certain of the components described herein may be removed and/or modified without materially affecting the scope of the present disclosure. Additionally, although depicted as a singular processing unit 102 and a single memory module 104, systems 100 with multiple processing units 102 and/or multiple memory modules 104 coupled through the interconnect 105 or multiple interconnects 105 are similarly within the scope of the present disclosure.

The interconnect 105 may comprise an interconnect fabric, where the fabric 105 may be a communication system that transfers data between the various components of the system 100. In some cases, the fabric may be a Peripheral Component Interconnect (PCI), Industry Standard Architecture (ISA), PCI-Express (PCIe), HyperTransport® (HT), NuBus, DDR, a proprietary bus, and the like. Alternatively, the processing unit 102 may use multiple different fabrics 105 to communicate with the memory module 104 or multiple memory modules 104.

The memory module 104 comprises a media controller 106 disposed between a memory 108 and the processing unit 102. In some examples, the media controller 106 may be contained in the memory 108. Additionally, the media controller 106 may perform additional functionality than that described herein to enable access to the memory 108. As explained, the memory 108 may comprise NVM such as a memristor, and thus may be sufficiently fast to be accessed using a direct-mapped load/store access model, in addition to a traditional block/DMA access model. In this way, lower latency is possible because a processing unit 102 may generate load/store accesses that directly target the NVM 108.

As explained above, it is advantageous to restrict write access to certain sensitive information stored in memory to enhance security of the system 100. Non-limiting examples of such sensitive information include system firmware, a system boot sequence, basic input/output system (BIOS), security logs, and the like. Typically, such sensitive information is stored on a dedicated write-once memory device. However, in accordance with various examples of the present disclosure, this sensitive information is stored on NVM 108, alongside with other information normally accessible (i.e., not write-once) by the processor.

The media controller also includes a write logic block 112 containing several modules 112a, 112b, 112c. The function of these modules 112a-c will be explained in further detail below, but the modules 112a-c may comprise hardware, a combination of hardware and software, or software to carry out various described functionality of the write logic block 112 and the media controller 106.

Figure 1B:
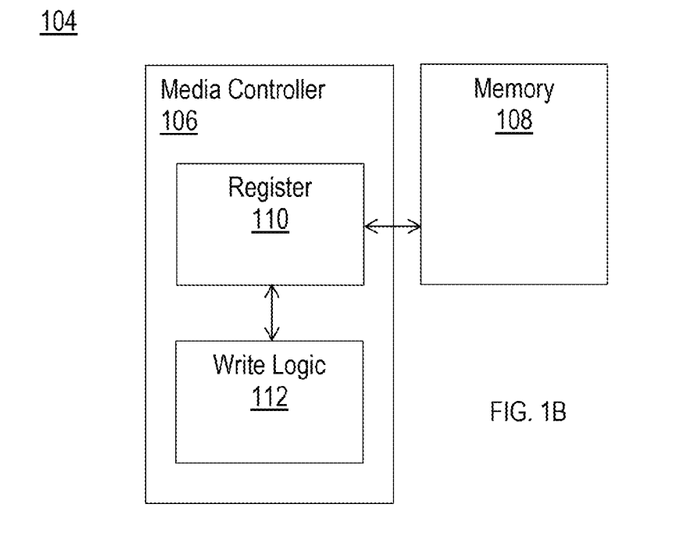
FIG. 1B shows a block diagram of a media controller of a memory module in further detail in accordance with various examples of the present disclosure.

FIG. 1B shows the media controller 106 of memory module 104 in further detail. As shown, the media controller 106 comprises a register 110 coupled to the NVM 108 and the write logic block 112. Of course, in practice, the media controller 106 may include multiple registers 110 and various different functional blocks; however, for simplicity, reference is made to the single register 110 and write logic block 112 depicted in FIG. 1B. In various examples of the present disclosure, the media controller 106, upon seeing a read or write request to one of its registers 110, may turn such requests into transaction flows to the NVM 108.

In accordance with various examples of the present disclosure, a read or write request may be redirected, by the media controller 106, from the processing unit 102 to write logic block 112 of the media controller 106. The media controller 106 receives the request and determines (e.g. by write logic block 112) whether the request is to write to a protected location in NVM 108. If the request is to read from a location, regardless of whether it is protected, the media controller 106 accesses NVM 108 and returns the data at that location to the processing unit 102.

If the request is to write to a protected location, the media controller 106 accesses the location and transfers the data stored at the location to the register 110. The media controller 106 then determines (e.g., by write logic block 112) whether the protected location is in a write-protected state.

In some examples, the information stored at a particular address or location in NVM 108 may include a data field, an error correction check (ECC) field, and a metadata field. Thus, in at least one example, the metadata field may be used to indicate whether that address or location in NVM 108 is in a write-protected state. In this example, the media controller 106 determines whether the location is in a write-protected state through simple analysis of the metadata field. The above functionality is demonstrative; however, it is also within the scope of the present disclosure to determine whether a portion of memory is write-protected in various other ways. Further, the metadata field may be used for additional purposes and is not limited solely to an indication of whether the location is in a write-protected state. For example, the metadata field may also indicate if the data stored at that location is encoded in a particular way, whether the data stored at that location is remapped to a new location, or to indicate other information.

If it is determined that the protected location is not in a write-protected state, the media controller 106 continues to write the data indicated by the request received from the processing unit 102 to the protected location. The media controller 106 also alters the metadata field to indicate that the protected location is now in a write-protected state, since the protected location is a write-once location.

However, in the event that the protected location is already in a write-protected state, for example as indicated by the metadata field, the media controller 106 rejects the write request. Rejection of a write request may take many different forms and the scope of the present disclosure is not restricted to any particular form. For example, in some cases the media controller 106 simply does not perform the write, while in other cases the media controller 106 returns a message to the processing unit 102 indicating that the write request has been rejected. Various other communications between the media controller 106 and the processing unit 102 may occur to rectify the rejection of a write request.

In accordance with various examples of the present disclosure, the protected location(s) in NVM 108 are used to store a validation key for another portion of the NVM 108, such as a checksum. In other examples, the protected location(s) in NVM 108 may be used to store a code/key pair that is desired to be subject to a write-once protection scheme. The scope of the present disclosure is not limited to any particular type of validation key. Thus, the other portion of the NVM 108 is used to store sensitive information such as system firmware, a system boot sequence, or BIOS, as noted above. However, write access is restricted only with respect to the validation key, while unnecessary memory access overhead is avoided by not implementing restricted write access to each address in the portion of the NVM 108 storing such sensitive information.

In these examples, the system 100 can validate the sensitive information in the other portion of NVM 108 by computing a fresh checksum for that portion. Subsequently, the computed checksum is compared to the validation key stored in the protected location of NUM. If the checksums match, then the system 100 has successfully validated the sensitive information. However, if the checksums do not match, then the system is aware that the sensitive information in the other portion of NVM 108 has been modified, and appropriate action can be taken. In one case, for example, this prevents or alerts a user to the fact that malware has accessed a sensitive portion of NVM 108, and allows the user to validate the authenticity of what is stored in a particular region of NVM 108. This validation process may occur, for example, as part of a boot sequence of the system 100 such that the boot sequence may be suspended, and further damage to the system 100 avoided, if the validation fails.

In certain designs of system 100, the media controller 106 may redirect read and write requests for an address or address range that corresponds to protected location(s) of NVM 108 to its write logic block 112. However, the media controller 106 may pass read and write requests for an address or address range that does not correspond to protected location(s) of NVM 108 directly to the NVM 108.

Figure 2A:
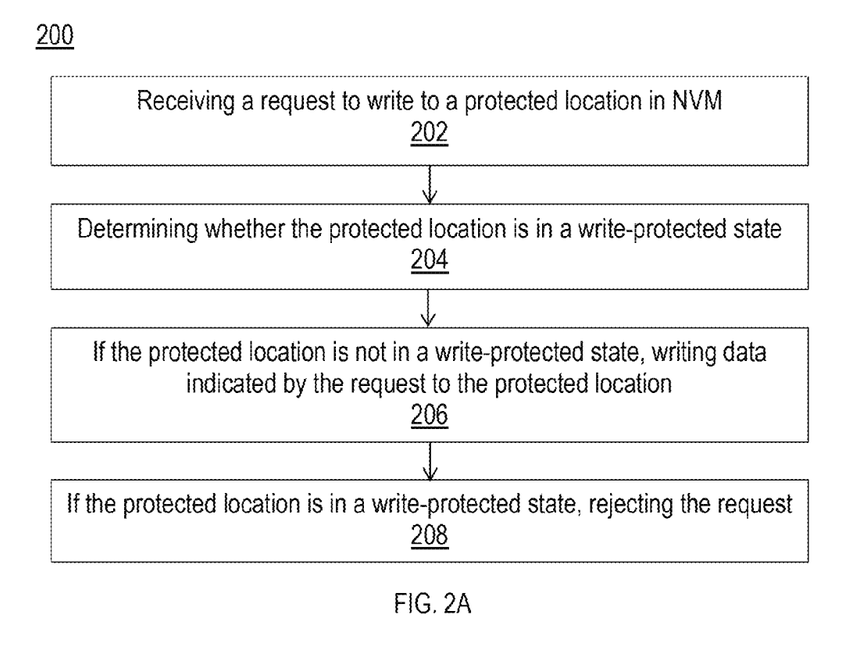
FIG. 2A shows a flow chart of a method in accordance with various examples of the present disclosure.

Turning now to FIG. 2A, a flow chart of a method 200 is shown, which reflects the above disclosure. The method 200 begins in block 202 with receiving, for example by the media controller 106, a request to write to a protected location in the NVM 108. The method 200 continues in block 204 with determining whether the protected location is in a write-protected state. As explained above, this may be carried out through an analysis of metadata associated with the data stored at the protected location. If the protected location is not in a write-protected state, the method 200 continues in block 206 with writing data indicated by the request to the protected location. Further, the method 200 may include altering the metadata for the protected location to now indicate that it is in a write-protected state. Alternately, if the protected location is in a write-protected state, the method 200 continues in block 208 with rejecting the request.

Figure 2B:
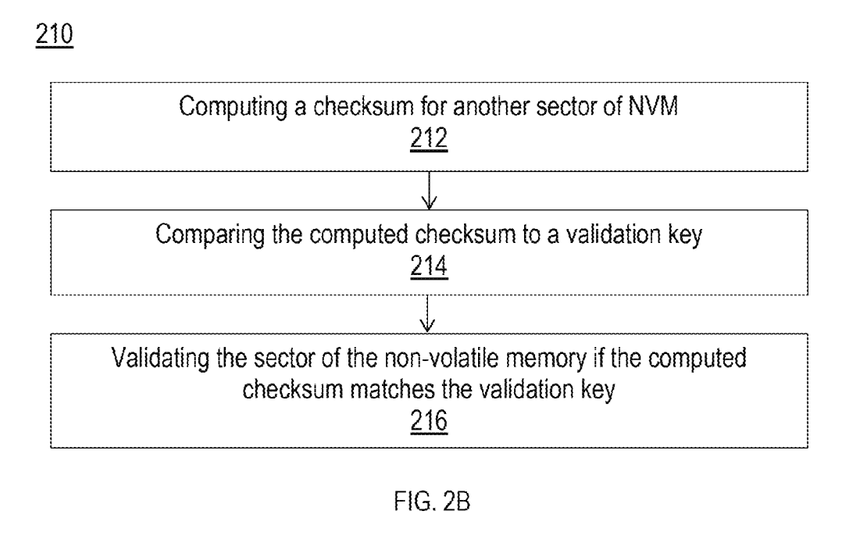
FIG. 2B shows a flow chart of further method steps of a method in accordance with various examples of the present disclosure.

FIG. 2B illustrates additional method steps 210, which relate to the validation of another region or portion in NVM 108 (e.g., that contains sensitive information), and may be performed in addition to the steps shown with respect to method 200. As explained above, these steps 210 may be performed during a boot process of the system 100. The steps 210 include in block 212 computing a checksum for the other portion of the NVM 108. The additional steps 210 continue in block 214 with comparing the computed checksum to the validation key stored in a protected location of the NVM 108. The steps 210 conclude in block 216 with validating the portion of the NVM 108 if the computed checksum matches the validation key. In this way, the authenticity of data stored in the portion of NVM 108 can be verified, for example during a boot procedure, and a user may be alerted if the validation fails.

Figure 2C:
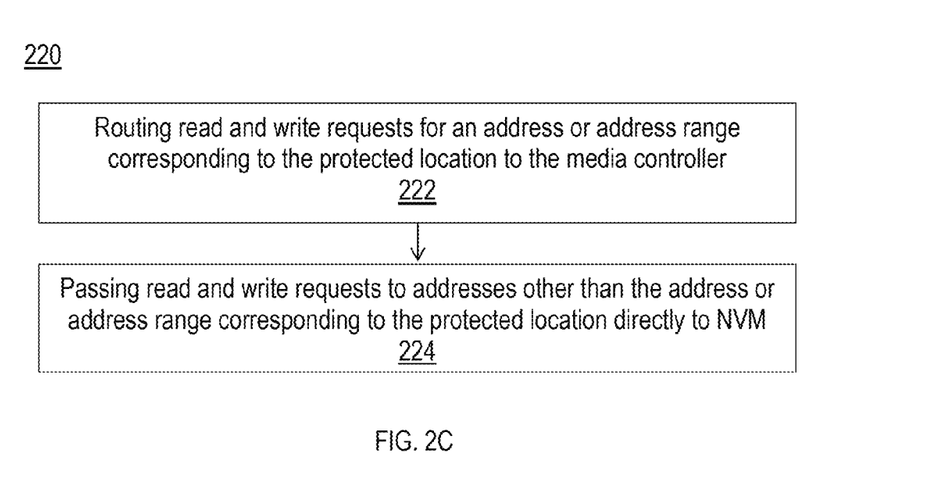
FIG. 2C shows a flow chart of further method steps of a method in accordance with various examples of the present disclosure.

FIG. 2C illustrates further method steps 220, which relate to the routing of data between the processing unit 102 and, ultimately, the NVM 108. In accordance with various examples of the present disclosure, the further steps 220 start in block 222 with routing read and write requests for an address or address range corresponding to the protected location to the media controller 106. However, in block 224, read and write requests directed to addresses other than the address or address range corresponding to the protected location are passed directly to the NVM 108.

Figure 3:
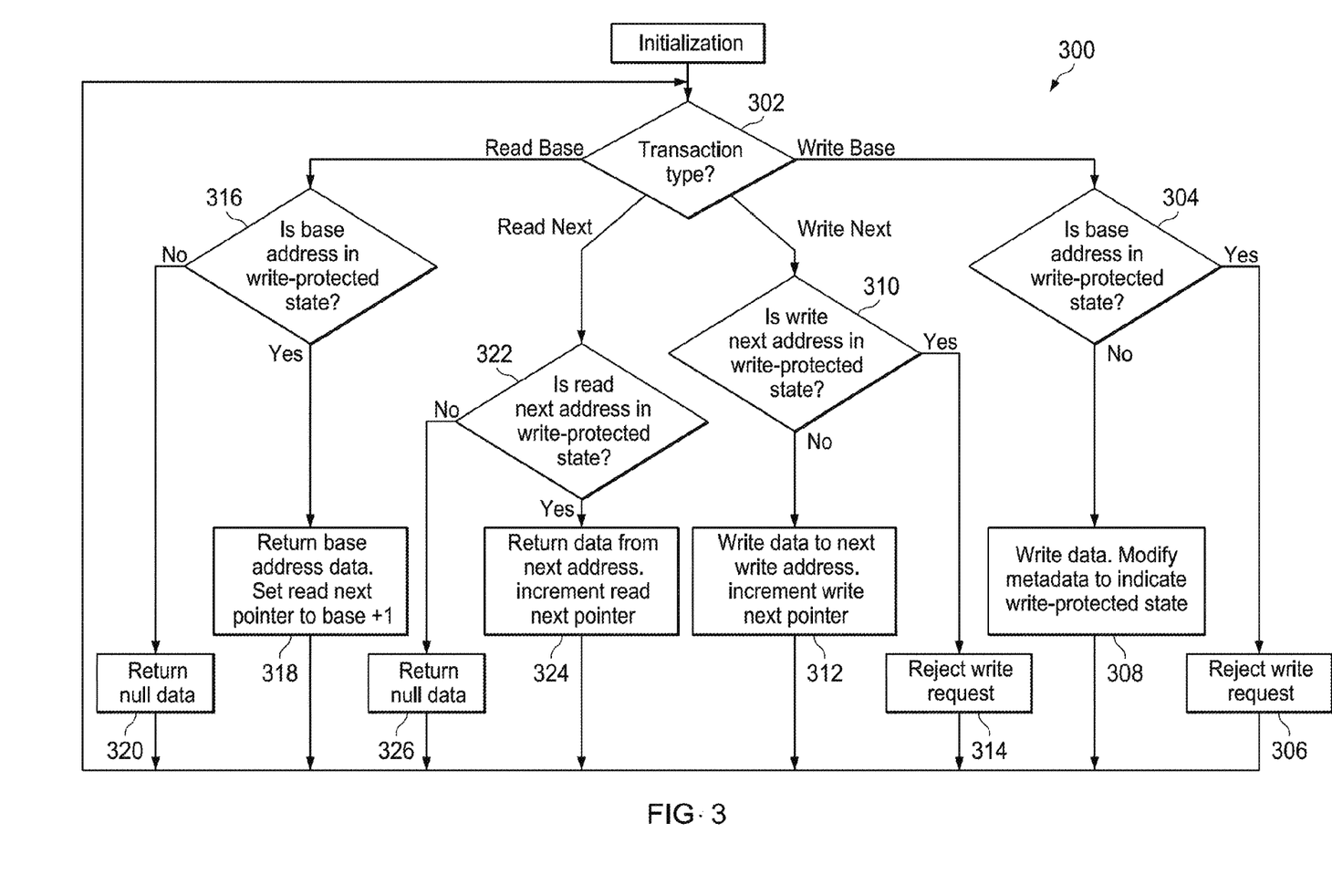
FIG. 3 shows a flow chart of an alternate method in accordance with various examples of the present disclosure.

Turning now to FIG. 3, a method 300 is shown that adds a secure logging feature to the above-described systems and methods. In accordance with various examples of the present disclosure, multiple addresses are allocated to the same protected location in NVM 108. In the following, these are referred to as a "base address" and a "next address." In particular, the "next address" typically contains a read next pointer or a write next pointer, which is a pointer to an address in the log that is incremented as the log grows; this is explained in further detail below. As is also explained in further detail, depending on which address a request is directed to, secure logging functionality may be implemented while retaining a write-once protection scheme for the protected location. The term log or log buffer may refer to any history of activity or other collection of data that would benefit from the disclosed write-one security features. The scope of the present disclosure is not limited to any particular type of log or log buffer.

Although not shown explicitly in FIG. 3, prior to the first use of NVM 108, NVM 108 (or a protected log buffer of NVM 108) may be initialized to a valid state, such as all zeros with a good ECC, where the metadata for these locations indicates they are not in a write-protected state. The scope of the present disclosure is not limited to any particular type of initialization of NVM 108. Further, a log address base and range may be set; these parameters indicate where the log begins and how large the log may become. In this case, the read next pointer and the write next pointer are initialized to point to the base address. Finally, the last address of the log may be initialized such that its data indicates that an overflow condition has been met and its metadata indicates that it is in a write-protected state. This prevents the boundaries of the log from being exceeded during operation.

The processing unit 102 may generate read or write requests to either the "base address" or the "next address" of the protected location, depending on the desired functionality for the particular request. As shown in FIG. 3, the method 300 begins in block 302 with determining a transaction type for the request, which may be "read base," "read next," "write base," or "write next." First, if the request is to write to the base address (i.e., "write base"), the method 300 continues in block 304 with determining whether the base address is in a write-protected state, for example as discussed above. If the base address is in a write-protected state, the method 300 continues in block 306 with rejecting the request. However, and similar to the systems and methods discussed above, if the base address is not in a write-protected state, the method 300 continues in block 308 with writing data indicated by the request to the base address and modifying the metadata of the base address to indicate it is now in a write-protected state. Thus, writing to the base address is largely the same as disclosed above. Further, in at least some examples, the "write base" feature is optional or not included.

If the request is to write to the next address (i.e., "write next"), the method 300 continues in block 310 with determining whether the next address (i.e., the address pointed to by the write next pointer stored at the next address) is in a write-protected state. If the next address is not in a write-protected state, the method 300 continues in block 312 writing data indicated by the request to the next address and incrementing the write next pointer. As above, the method also includes modifying the metadata of the next address to indicate it is now in a write-protected state. If the next address is in a write-protected state, this indicates that the end of the log has been reached (referring to the above initialization procedure), and thus the method 300 continues in block 314 with rejecting the request.

As a result, the method 300 prevents access to previously-written locations in the log, as the write next pointer is continually updated as writes to the next address are attempted, and writes to the base address are blocked as explained with respect to the foregoing figures. In this way, a log is created that tracks activities in the system, where the log cannot be modified or "spoofed;" thus, the log can be relied upon as accurate. Further, the log can be read, by initiating a load read with a read-base and a sequence of read-next transactions. Additionally, a sequence of sensitive code checksums can be recorded by providing a write next each time sensitive data is written (e.g., that is updated or maintained by a sanctioned process), as a mechanism to allow updates of the sensitive code, with updated validation from the new checksum. Further, the log may subsequently be utilized by a system 100 administrator to recreate events including attempted modifications to the system 100, to a configuration of the system 100, to software execution of system 100, or to certain locations in the NVM 108. The method 300 may also provide a mechanism to protect an arbitrarily large write-once region by allocating a desired region size. This could, for instance, be used as a water mark for the memory, or system that is unique and cannot be altered.

Referring now to read requests from the processing unit 102, if the request is to read to the base address (i.e., "read base"), the method 300 continues in block 316 with determining whether the base address is in a write-protected state, for example as discussed above. If the base address is in a write-protected state, the method 300 continues in block 318 with returning data from the base address and setting a read next pointer to a second address (i.e., incremented from the base address) in the log. However, if the base address is not in a write-protected state, this indicates that no data has yet been written to the base address, and the method 300 continues in block 320 with returning null data. Null data refers to any data that is understood by the processing unit 102 to indicate that no useful or valid data is contained at that location (e.g., all zeros).

If the request is to read to the next address (i.e., "read next"), the method 300 continues in block 322 with determining whether the next address (i.e., the address pointed to by the read next pointer stored at the next address) is in a write-protected state. If the next address is in a write-protected state, the method 300 continues in block 324 with returning data from the next address and incrementing the read next pointer. Similarly, if the next address is not in a write-protected state, this indicates that no data has yet been written to the next address, and the method 300 continues in block 326 with returning null data. Further, although not explicitly shown, if the request is to read from the next address and the read next pointer points to the same address as the write next pointer, the method may include returning null data, as this is another indication that data has not yet been written to the next address.

The foregoing method 300 introduces certain side effects, namely that reads or writes to the apparent "same address" (i.e., the next address) actually generate different responses. Thus, a system 100 employing the method 300 utilizes an overall system design that takes this into account. For example, such transactions may be employed only on a reliable fabric (e.g., one that is capable of handling atomic type operations), or code issuing these transactions takes these side effects into account.

Referring back to FIG. 1A, the modules 112a-c may perform any of the functionality described above with respect to FIG. 2A, 2B, 2C, or 3. That is, the modules 112a-c comprise hardware logic, software instructions, or a combination thereof arranged to carry out the functionality described in the method flowcharts herein. For example, module 112a may receive a request to write to a protected location in NVM 108, as shown in block 202 of the method 200. Similarly, module 112b may determine whether the protected location is in a write-protected state and if so, reject the request as in blocks 204 and 208 of the method 200. The module 112c may determine whether the protected location is in a write-protected state and if not, write data indicated by the request to the protected location as in blocks 204 and 206 of the method 200.

Further, the media controller 106, the write logic 112, or the modules 112a-c associated with the write logic could, in certain examples, be implemented as instructions stored on a non-transitory computer-readable medium. These instructions, when executed by a processor, cause the processor to carry out any of the various methods or functionality described herein. The scope of this disclosure is not limited to any particular implementation of the described methods and functionality.

Figure 4:
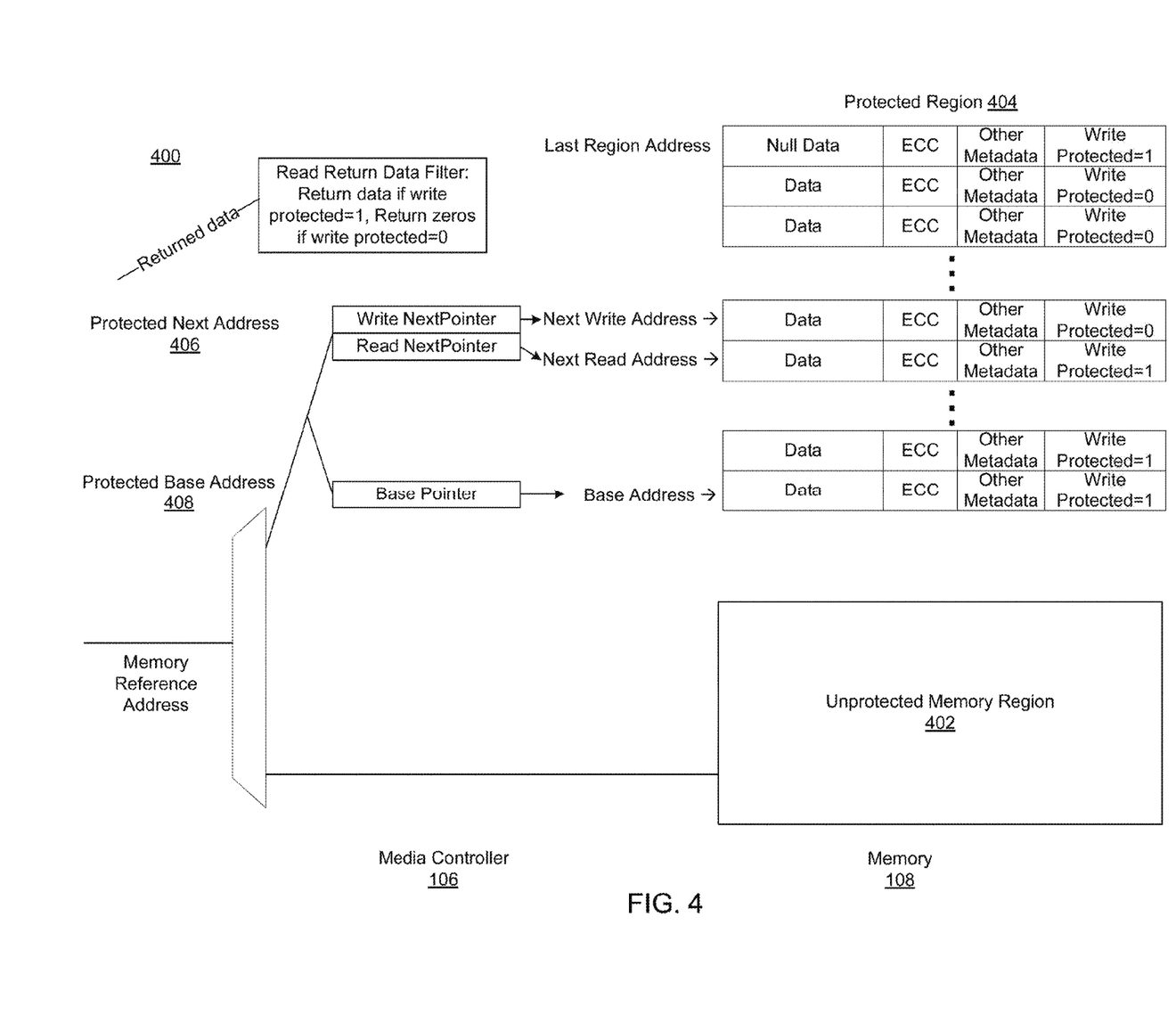
FIG. 4 illustrates one implementation of the base address and next address constructs referred to in FIG. 3, in accordance with various examples of the present disclosure.

Briefly referring to FIG. 4, an illustration 400 demonstrates one example of an implementation of the base address and next address constructs explained above with reference to FIG. 3. The NVM 108 is shown as segmented into an unprotected region 402 and a protected region 404. As shown, the media controller 106 comprises pointers that are associated with the "next address" 406 and the "base address" 408. As explained above, both the read next pointer and the write next pointer are incremented in certain scenarios, such that the next address read to or written from when accessing the "next address" construct of the media controller 106 will be different (i.e., incremented) relative to the last address read to, or written from, respectively. Further, note that the last address of the log in the protected region 404 contains null data (e.g., all zeros) and is in a write-protected state, as explained above with respect to FIG. 3.

Unlike the read next pointer and write next pointers, the base pointer is not incremented; thus, when accessing the "base address" construct of the media controller 106, access is always attempted to the same location in the protected region 404, namely the base of the log. Further, FIG. 4 also illustrates that the media controller 106 passes requests to the unprotected region 402 without such overhead.

The above discussion is meant to be illustrative of the principles and various examples of the present invention. Numerous variations and modifications will become apparent to those skilled in the art once the above disclosure is fully considered. It is intended that the following claims be interpreted to embrace all such variations and modifications.

What is claimed is:

1. A method for restricting write access to a non-volatile memory, the method comprising:
   routing read and write requests for an address or address range corresponding to a protected location in the non-volatile memory of a memory module including a media controller and the non-volatile memory from a processing unit to the media controller;
   passing read and write requests for addresses other than the address or address range corresponding to the protected location from the processing unit directly to the non-volatile memory;
   receiving, by the media controller, a routed request to write to the protected location in the non-volatile memory;
   determining whether the protected location is in a write-protected state;
   if the protected location is not in a write-protected state, writing data indicated by the routed request to the protected location; and
   if the protected location is in a write-protected state, rejecting the routed request.

2. The method of claim 1 wherein the protected location stores a validation key to validate the contents of another portion of the non-volatile memory, and the validation key comprises a checksum to validate the contents of the other portion.

3. The method of claim 2 further comprising:
   computing a checksum for the other portion of the non-volatile memory;
   comparing the computed checksum to the validation key; and
   validating the portion of the non-volatile memory if the computed checksum matches the validation key.

4. The method of claim 1 wherein determining whether the protected location is in a write-protected state comprises analyzing, in a register of the media controller, whether a metadata field of the data stored at the protected location indicates that the protected location is in a write-protected state.

5. A method for restricting write access to a non-volatile memory and maintaining a log buffer, the method comprising:
   defining the log buffer by an address range within the non-volatile memory starting at a base address and ending at a last address;
   initializing the log buffer by resetting each location within the address range other than at the last address as not in a write-protected state, and resetting a location at the last address as in the write-protected state;
   receiving, by a media controller associated with the non-volatile memory, a request to write to a protected location in the non-volatile memory, the protected location comprising a base address and a next address;
   if the request is to write to the protected location and the protected location is in a write-protected state, rejecting the request;
   if the request is to write to the next address that is not in the write-protected state, writing data indicated by the request to an address indicated by a write next pointer, setting the location at the next address as in the write-protected state, and incrementing the write next pointer.

6. The method of claim 5 further comprising:
   receiving, by the media controller, a request to read from the protected location;

if the request is to read from the base address and the base address is in the write-protected state, returning data from the base address and setting a read next pointer to a second address in the log buffer;

if the request is to read from the next address and the address pointed to by the read next pointer is in a write-protected state, returning data from the address pointed to by the read next pointer and incrementing the read next pointer.

7. The method of claim 6 further comprising:

in response to determining that the request is to read from the base address and the base address is not in the write-protected state, returning null data;

in response to determining that the request is to read from the next address and the address pointed to by the read next pointer is not in the write-protected state, returning the null data.

8. The method of claim 6 further comprising:

in response to determining that the request is to read from the next address and the read next pointer points to the same address as the write next pointer, returning the null data.

\* \* \* \* \*